United States Patent [19]
Nelson

[11] Patent Number: 4,561,718
[45] Date of Patent: Dec. 31, 1985

[54] PHOTOELASTIC EFFECT OPTICAL WAVEGUIDES

[75] Inventor: Arthur R. Nelson, Stow, Mass.

[73] Assignee: Sperry Corporation, New York, N.Y.

[21] Appl. No.: 525,067

[22] Filed: Aug. 22, 1983

[51] Int. Cl.$^4$ ............................................. G02B 6/10
[52] U.S. Cl. ........................ 350/96.14; 350/96.12; 350/355; 29/569 R
[58] Field of Search ............... 350/96.11, 96.12, 96.13, 350/96.14, 354, 355, 356; 29/569, 570, 571

[56] References Cited
U.S. PATENT DOCUMENTS

| | | | |
|---|---|---|---|
| 3,695,747 | 10/1972 | Maldonado | 350/150 |
| 4,005,927 | 2/1977 | Caton | 350/96.14 |
| 4,166,669 | 9/1979 | Leonberger et al. | 350/96.14 |
| 4,175,827 | 11/1979 | McMahon | 350/96.14 |
| 4,179,184 | 12/1979 | Nelson | 350/96.14 |

FOREIGN PATENT DOCUMENTS
0089449  8/1978  Japan ..................... 350/96.14

Primary Examiner—William L. Sikes
Assistant Examiner—Akm E. Ullah
Attorney, Agent, or Firm—Howard P. Terry; Arnold L. Albin

[57] ABSTRACT

An optical waveguide apparatus provides for single-mode and multimode switching or modulation of light wave energy with reduced bias voltages. Optical channels are formed in a crystal substrate by depositing film stripes thereon to cause stress-induced changes in the relative refractive index. Coupling or switching of light waves between the channels is provided by applying a bias which is of reversed polarity at adjacent film stripes, thereby augmenting or diminishing the stress in individual channels. By allowing operation with close spacing of the electrodes and using the enhancement in refractive index change of the stressed substrate in combination with the applied bias, the required control voltage is substantially reduced.

14 Claims, 6 Drawing Figures

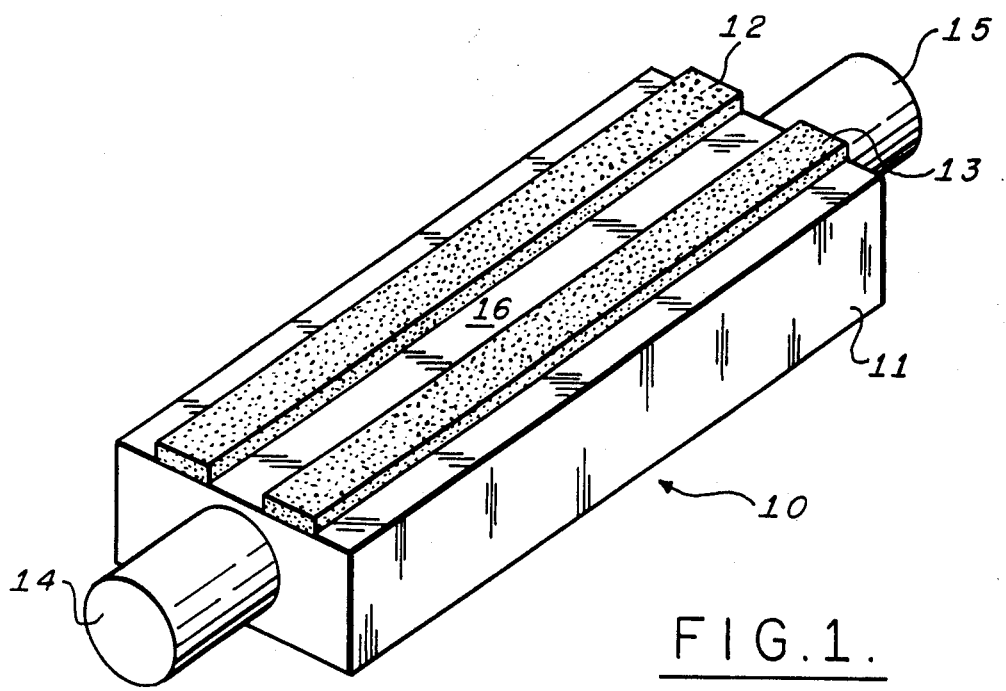
FIG.1.
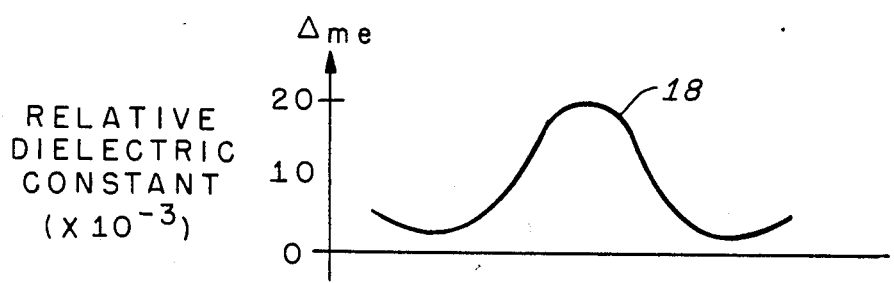
FIG.2.1.
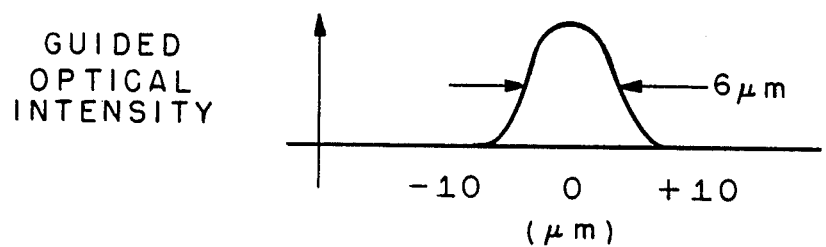
FIG.2.2.

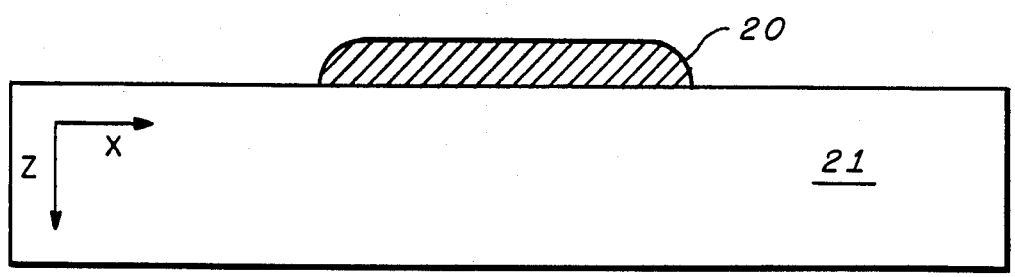
FIG.3.1.
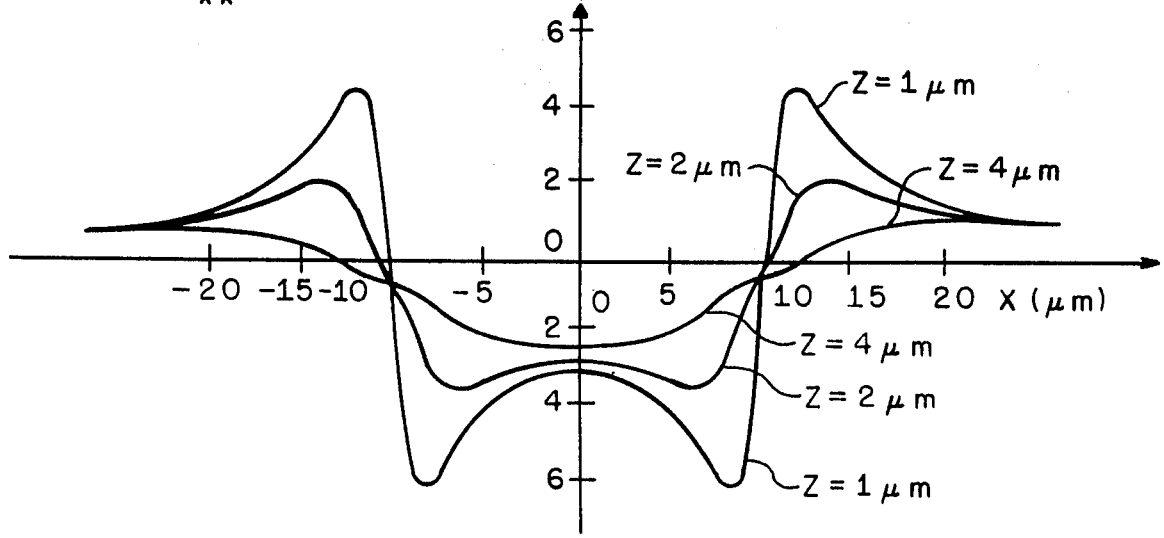
FIG.3.2.
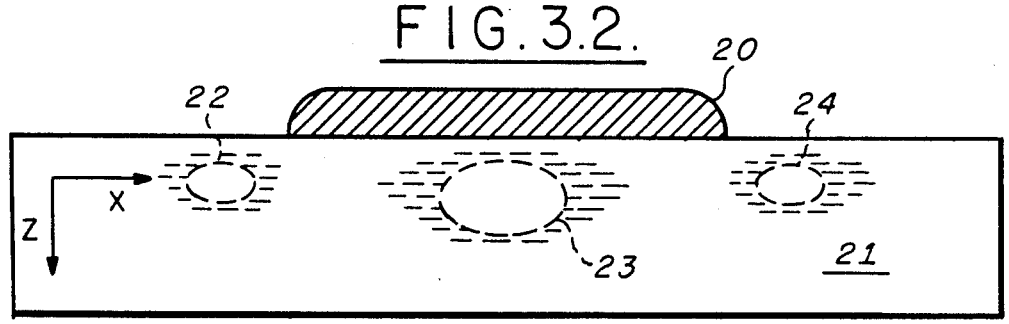
FIG.4.1.
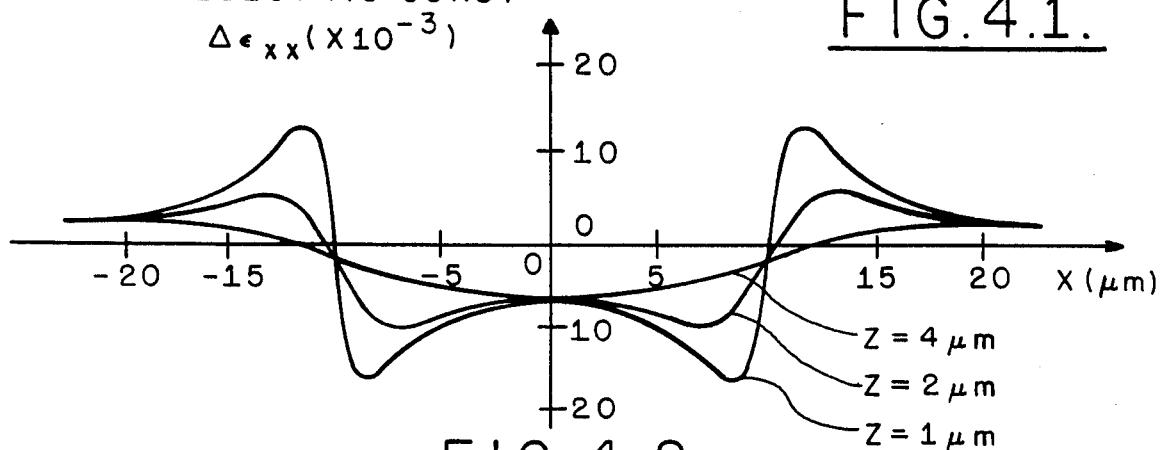
FIG.4.2.

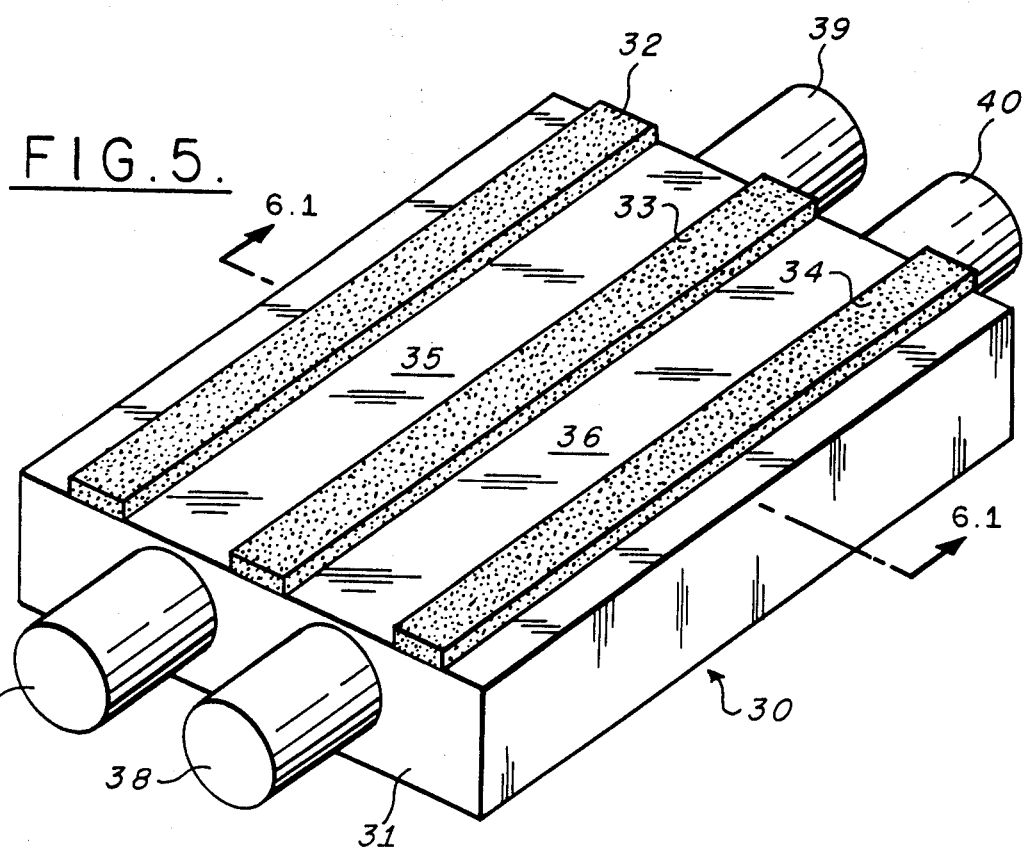
FIG.5.
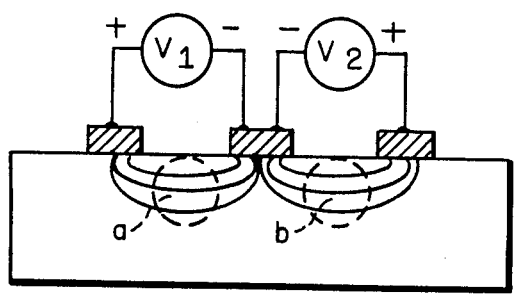
FIG.6.1.
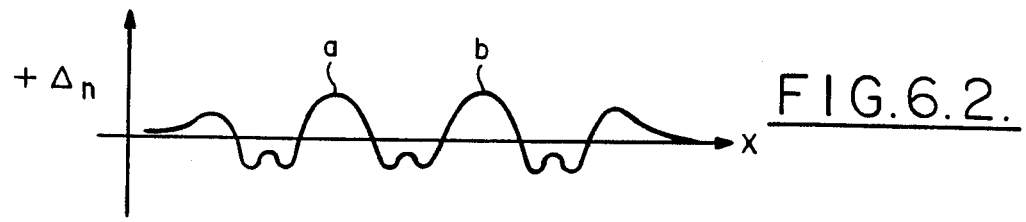
FIG.6.2.

PHOTOELASTIC EFFECT OPTICAL WAVEGUIDES

BACKGROUND OF THE INVENTION

1. Field of the Invention

This invention relates to optical waveguides, and, more particularly, to optical waveguides, modulators and switches utilizing the photo-elastic effect in combination with the electro-optic effect.

2. Description of the Prior Art

Optical waveguides have been described which utilize an optically transparent crystal such as gallium arsenide (GaAs), lithium tantalate (LiTaO$_3$) or lithium niobate (LiNbO$_3$) and which form a channel for guiding light wave energy by applying a bias voltage to electrodes on the material, thereby effecting a change in the refractive index of the material. The refractive index change leads to the formation of an optical waveguide in a region wherein the refractive index is increased relative to the surrounding area. Similarly, this phenomenon has also been observed in a region wherein the material is biased so as to cause a decrease in the relative refractive index, when two such biased regions bound a normal region. This effect is called the electro-optic effect and is due to the change in the dielectric constant and hence the refractive index of the crystal in response to the applied bias voltage. Light travelling in a medium having a transverse variation in refractive index is reflected towards regions having the larger refractive index.

The localized region may be defined by a pair of spaced electrodes disposed on a planar surface of electro-optical material in side-by-side relationship, as disclosed by D. J. Channin in U.S. Pat. No. 3,795,433 for Voltage Induced Optical Waveguide Means, issued March, 1974, or with electrodes disposed on opposing surfaces of the electro-optic material, as disclosed by M. Furukawa in U.S. Pat. No. 3,965,745 for Light Wave Guide Circuit, issued Oct. 3, 1972.

Electro-optic responsive crystals, such as lithium niobate (LiNbO$_3$) and lithium tantalate (LiTaO$_3$), can be characterized by positive or negative electro-optic coefficients, so that, by selecting an appropriate bias potential, with choice of the plane of the crystal on which the electrodes are deposited and suitable poling of the material, the refractive index in the waveguide region may be caused to increase or decrease as desired. Thus, by proper choice of the electrode disposition and corresponding voltage excitation, electro-optic materials have been utilized to provide modulators and switches as well as waveguides. See for example, U.S. Pat. No. 4,145,109, Electro-Optic Multiplexing With High Interchannel Isolation, issued Mar. 20, 1979, invented by the present inventor and assigned to the assignee of the present invention.

A disadvantage of the prior art electro-optic devices is their relatively low sensitivity, requiring applied potentials as high as 400 volts between electrodes. Because of the extremely thin wafers of materials used and the close proximity of the electrodes, arcing between electrodes frequently results, resulting in degradation or destruction of the device. While both direct current and alternating current may be applied to the electrodes, high dc voltage gradients may permanently change the refractive index of the crystal, while ac voltages are effective for only one half of the wave cycle. Further, LiNbO$_3$ is susceptible to damage to the crystalline structure at high optical excitation levels.

Other waveguides have been formed by diffusing a transition metal such as titanium (Ti) into a LiNbO$_3$ crystal substrate to form a guiding layer of increased refractive index. Permanent waveguides are thereby formed without the need for applied bias voltage. Such waveguides can be formed by evaporating a thin layer of the metal on the surface of the crystal and then heating the crystal to a suitable temperature for diffusion.

In preparing a crystal substrate for electro-optic use, it is first "poled" by the well-known technique of heating the material above the Curie temperature and cooling in an electric field. This aligns the molecular structure so as to polarize the crystal, thereby rendering it sensitive and responsive to the imposition of an applied electric field or diffused metal stripes and hence exhibiting the electro-optic effect. If heated again beyond the Curie temperature, the material will be depoled, thus losing its desirable electro-optic properties. It has been found that a material such as LiTaO$_3$, which is preferable for use as a substrate due to its lesser susceptibility to optical damage, is depoled by the diffusion process, since the diffusion requires a temperature of 1100° C. while the Curie temperature of LiTaO$_3$ is 600° C. Diffusion into LiTaO$_3$ at temperatures below 600° C. is feasible but very slow. Further, Ti-diffused guides have substantial losses of approximately 1 dB per cm. Such losses limit the optical performance of the waveguide and degrade the performance of devices such as modulators and switches. It is a characteristic of integrated optic modulators and switches that they can be made to operate at lower voltages and hence provide increased sensitivity if the device is made longer to increase the coupling area. However, if the waveguide is inherently lossy, the increased attenuation due to the increased device length outweights the prospect of improved performance. Modulators and switches have been constructed in recent years using such Ti-diffused waveguides and LiNbO$_3$ substrates, with the coupling of light between adjacent waveguide channels controlled by a voltage bias applied to selected electrodes. However, the applied voltage required for 100% modulation or complete switching has still proved to be excessive for many applications. Further, the diffusion of metal ions such as Ti into LiNbO$_3$ has been effectively limited to utilization in single-mode guides that are of the order of a wavelength in width. For multi-mode structures, which are preferable from some viewpoints, such as the availability of coupling devices, the required cross-sectional area of the guide is much larger and only the voltage induced refractive index change phenomena has been used.

Recently, photo-elastic guides were reported using evaporated metal or SiO$_2$ stripes on LiTaO$_3$ and LiNbO$_3$ substrates. These guides were observed to offer real advantages over the previously used voltage-induced guides and single-mode Ti-diffused guides on LiNbO$_3$, as reported by the present inventor in Photo-Elastic Waveguides in LiTaO$_3$, and LiNbO$_3$, Appl. Opt. 19, 3423 (1980). In devices using the photo-elastic effect, the waveguide is caused, at least in part, by the effect of changing the refractive index by the stress field in the semi-conductor material surrounding a deposited stripe, or in a window formed between a plurality of such stripes. This stress field results from the state of compression or tension induced by the deposited film due to the differing thermal expansion coefficients of the substrate and the deposited film and the elevated temperature required for deposition. Using the photo-elastic effect, it is possible with the correct pattern of an evaporated film to produce regions of increased refractive index that will guide light. The previously disclosed work by the present inventor used evaporated films of gold with a chromium flash to promote adhesion. These films had moderately large stress values initially; however, with time the stress faded due to relaxation of the film and, accordingly, the photo-elastic properties deteriorated.

SUMMARY OF THE INVENTION

The present invention operates on the principle that a metallic dielectric stripe deposited in compression or tension on an optically transparent and electro-optically responsive crystal substrate results in stress-induced refractive index changes. By appropriate choice of the deposited film and heat treatment, devices demonstrating strong waveguide effects and permanence have been obtained. Thus, a preferred embodiment of an optical waveguide comprises an optically transparent substrate having an effective index of refraction responsive to voltage gradients and stress applied to the substrate, a plurality of stressed film stripes disposed on at least one surface of the substrate, thereby defining at least one channel having a substantially permanent stress induced change in refractive index for guiding incident lightwave energy, and responsive to a bias voltage applied between at least one pair of adjacent conductive film stripes; the application of the voltage causing a change in the induced refractive index so as to propagate or reflect light wave energy in traversing the waveguide channel, in accordance with the applied polarity and amplitude of the voltage.

In an optical switch, a plurality of stressed metallic electrodes are disposed on one surface of the substrate with means for applying a bias voltage to each adjacent pair of electrodes, alternate electrodes reversed in polarity, and polarized to cause an increase or decrease in the refractive index of the guide regions, thus permitting channelling the lightwave energy through selected ports of the waveguide, or modulation of the applied wave energy.

BRIEF DESCRIPTION OF THE DRAWINGS

FIG. 1 is a perspective view of a one-channel photo-elastic optical waveguide;

FIG. 2 shows characteristic curves of relative dielectric constant and guided optical intensity for the waveguide of FIG. 1 with narrow stripe spacing;

FIG. 3 shows a characteristic curve of tensile stress for a metallic film deposited on a crystal substrate;

FIG. 4 shows characteristic curves of relative dielectric constant for the waveguide geometries of FIG. 3, also showing light guiding channels related thereto;

FIG. 5 is a perspective view of a two channel optical waveguide employing both photo-elastic and electro-optic technology;

FIG. 6 shows curves of the voltage gradient and stress induced refractive index profile for the device of FIG. 5.

DESCRIPTION OF THE PREFERRED EMBODIMENTS

Referring to FIG. 1, there is shown an optical waveguide apparatus 10, which includes a substrate 11 of optically transparent material which is both electro-optically and photoelastically responsive. Deposited in the conventional manner on one surface of the substrate are stripes of electrodes 12 and 13. The electrodes are deposited in a manner so as to induce a stress in the substrate and consequent change in index of refraction, and may be either conductive or insulating. Under normal conditions a deposited film on a substrate of differing composition will exert stress on the substrate. This stress may arise from a combination of differing thermal coefficients of expansion between the substrate and the film and application of the film at an elevated temperature or may be due to an intrinsic stress that characterizes the deposited film. Those skilled in the art will recognize that in lieu of depositing two individual stripes of electrodes, a single film may be deposited on the surface of the substrate 11 and a window 16 opened therein by etching or lift-off processing, for example. Ports 14 and 15 serve as an input and output, respectively for the light wave energy. By virtue of the symmetry in construction, the ports 14 and 15 operate in a reciprocal manner.

FIG. 2 shows the relative dielectric constant (2.1) and resulting light waveguide channel (2.2) where the film stripes are spaced approximately 10 $\mu$m apart. A single well-defined chanel is seen to result, even in the absence of any applied bias voltage to the film stripes. As shown in the Figure, when the electrodes 12 and 13 are relatively closely spaced, as required for a single-mode waveguide, a region of increased relative dielectric constant 18 is found centered between the electrodes. In the example shown, the half-power optical intensity is obtained at approximately 6 $\mu$m in channel width. Typically, the channel depth is of the order of 2 $\mu$m.

A light guide may also be formed by depositing a single wide film stripe, such as chromium, on a crystal substrate such as $LiNbO_3$. FIG. 3 shows a sectional view (3.1) through a film 20 and substrate 21, which may be a Y-cut crystal, wherein regions of increased and decreased tensile strength adjacent the stripe edges are induced (3.2). FIG. 4 shows light guide regions 22, 23 and 24 corresponding to regions of increased and decreased refractive index. These refractive index perturbations are relatively shallow and fade with increasing distance into the crystal.

The light propagating channels described above are induced by the application of a stress transverse to the substrate along the desired propagating path. These light guiding channels may be established by stripes deposited so as to be in tension or in compression thereby changing the refractive index of the photo-elastic substrate. Whether an increase or decrease of refractive index occurs depends on the geometry of the film, the spacing of the stripes, and the plane in which the crystal is cut. By virtue of the stress induced photo-elastic effect, light guiding chanels are established without the use of diffused electrodes and without the need to apply a bias potential between electrodes. Other alternative methods of producing useful guides may be used. These methods include evaporating a stripe of a film under tension, characteristic of most metals; evaporating a stripe of dielectric film (such as $SiO_2$) under compression; opening a stripe window in an evaporated film under tension, or opening a window in an evaporated film under compression. All four methods will produce one or more regions of increased refractive index.

The principles and structure outlined above can be used in the construction of optical modulators and switches. However, to perform the switching operation, it is necessary also to utilize the electro-optic properties of the substrate. Thus, by suitably polarizing an applied bias voltage of sufficient amplitude, the stress induced refractive index profile can be modified in selected regions between pairs of activated electrodes. By varying the amplitude of the potentials applied to the electrodes in accordance with a desired input signal, the refractive index of the optical channel can be accordingly modified, thereby resulting in modulation of the optical wave. Similarly, by enhancing the refractive index in one channel and diminishing the refractive index in an adjacent channel to control evanescent wave coupling, an input optical wave can be caused to switch between channels. Similar concepts apply to coupling of energy from one channel to multiple outputs to form a splitter or combiner.

While the crystals used for the above structures may have birefringent properties, that is, the magnitude of the waveguide effect may be dependent on the light beam polarization, this does not significantly change the basic operation of the devices. For single mode guides, the incident light will be polarized, and the light beam may be oriented with respect to the crystal to maximize the waveguide effect for that polarization. For multimode operation, the incident light is generally unpolarized, hence, either a polarizer is used and one-half the incident energy is discarded, or the unpolarized light beam may be used, permitting greater crosstalk due to escape of the light from one polarization from the weaker light guide. Since, in some cases, both polarizations will give satisfactory performance, and in other cases, the weaker guide for one polarization may cause the guide or switch to perform poorly due to excessive leakage and cross-talk, the choice of which approach to use for the multimode case must be made for each individual device configuration.

Advantage can be taken of the additive effects of the change in refractive index induced by neighboring electrodes to fabricate a highly efficient optical apparatus of this type. The present invention provides an improved design that results in lower operating voltages and a stronger waveguide effect. This embodiment is shown in FIG. 5. Optical waveguide apparatus 30 includes a substrate 31 of optically transparent material responsive to stress and voltage induced changes in the refractive index. Electrodes 32, 33, and 34, which may be comprised of chromium, aluminum, or gold, are deposited in a conventional manner on one surface of the substrate. Ports 37, 38, 39, and 40 are used to couple input and output light fibers to the apparatus.

The operation of the device may be understood by referring to FIG. 6. FIG. 6.1 shows a cross section through the optical apparatus 30 taken, for example, at a midpoint thereof transverse to the path of propagation of the light waves. FIG. 6.2 shows the stress induced refractive index profile wherein two well defined channels at a and b are disposed midway between electrodes 32-33 and 33-34, respectively. In the absence of any applied voltage bias to the electrodes, two channels of high refractive index are induced in the substrate. As a result of relatively close electrode spacing, the interaction between the stresses produced by adjacent electrodes results in a larger change in refractive index, and therefore a stronger guide, then in the widespread two electrode structure of the prior art. In this structure, the light wave energy extends beyond the waveguide channel into the surrounding region, and as such, the propagating electromagnetic wave is said to be evanescent.

With zero voltage applied to the metallic stripes, light energy periodically and continuously couplesbetween the two optical waveguides. Any mechanism that acts to change the index of refraction of the guides or the index of the coupling region between the guides will change the periodicity of the coupling and cause switching of at least some of the light from one output port to the other output port. Thus, application of voltage to the electrodes 32, 33, and 34 controls the periodicity of this coupling, so that light energy may be switched partially (i.e., modulated) or completely between the two output ports, as a function of applied voltage level and polarity. It has been found that the efficiency and sensitivity of the apparatus is greatly enhanced by applying a bias of reversed polarity to the adjacent electrodes stripes, thereby allowing operation with reduced voltage for switching or modulation. Alternatively, higher voltages will produce stronger guides than equal voltages applied to prior art devices of this type.

Beneficially, the device of FIGS. 5 and 6 shows improved sensitivity over the prior art, the most significant factor being the reduction in voltage required for switching or modulation. The stress pattern of a two-electrode device of the prior art typically required a distance between electrodes of approximately 20 $\mu$m, or approximately two times the width of one wave guide. In the present invention the distance between electrodes is now essentially the width of one waveguide. Since the bias required to produce a given voltage gradient and thereby a given index change is approximately proportional to the distance between electrodes, the sensitivity to voltage is improved by a factor of about two. In addition, the polarities of the voltages applied to the respective pairs of electrodes in the device of FIG. 6 may be selectively chosen so as to chage the index of each guide in the opposite sense as contrasted to a two electrode configuration where the index of both guides and coupling region is either increased or decreased simultaneously. The capability of the guide indices in opposing directions adds to the effectiveness of controlling the waveguide coupling and provides another factor of two or greater in reduction of the required switching voltage. Thus, the total required voltage is reduced by a factor of four or more where used as a switch, and, when used as a modulator, the sensitivity is increased by a factor of four or more. Moreover, the additive effects of the stress induced index changes from adjacent electrodes of a three-electrode device also provides a stronger waveguide. A stronger channel is able to capture more of the light from the input light source and therefore improves the efficiency of the device. The greater index difference between the channel core and the peripheral regions provides for a better coupling match for optical fibers since it effectively provides a larger numerical aperture. In an optical fiber system, this will provide a total greater index difference between the core and cladding regions thus enhancing the efficiency.

Essential to the efficient operation of an optical waveguide apparatus of this type is the selection of the optimum metal for the electrodes, a suitably responsive material for the substrate, and the method of deposition of the electrodes to assure permanence of the stress induced changes in refractive index. It has been found that the most important parameter is the metal deposited for the electrodes. Gold, aluminum and chromium have been found to be suitable in this application. However, chromium has been determined to have the largest inherent stress without using heating to create additional stress from the mismatch from thermal expansion coefficients of the substrate and the metal film. The inherent stress from chromium is 5 to 10 times larger than that due to gold. While the ion diffusion method referred to heretofore requires heating to temperatures of the order of 1,000° C., with its adverse effects on the substrate, it has been found that heating a chromium film to 150° C. for a period of at least one hour and then cooling back to room temperature results in a temporarily large increase in stress of the order of 2 to 1. The stress of gold film under the same temperature treatment increased by a factor of about 5. In initial experiments, it was found that heating for a period of approximately one hour resulted in relaxation of the stresses back to a lower final value with the lapse of time. However, with chromium films, by heating up to 18 hours, which was not found to be critical, the final relaxed value was significantly higher than the initial value, so that this heating technique provides a method for making improved stronger, permanently stressed induced waveguides.

The intrinsic stress has also been found to be dependent on the deposition rate, since this rate effects the formation of the film. The best results are obtained with chromium deposited at a rate of 3–4 Å/sec, which provided about 30% higher stress than for the average of other deposition rates.

Measurements on $LiTaO_3$ and $LiNbO_3$ crystals of various orientations show the stress effects were not apparently dependent on which crystal or orientation was used.

It has been shown thus that the present invention provides an improved optical waveguide apparatus utilizing both photoelastic and elctro-optic effects to change the refractive index of a crystal substrate. Chromium shows marked superiority to other metals due to its high internal stress after evaporation. This stress can be fixed permanently by suitable heat treatment. Both $LiTaO_3$ and $LiNbO_3$ are suitable for fabrication of the devices. Stressed induced guides are virtuely lossless and as disclosed herein have substantial improvements in sensitivity. Moreover, the reduced attentuation permits fabricating such device of greater length, which can provide additional sensitivity. The device can be constructed with the preferred $LiTaO_3$ substrate without regard to depoling or optical damage effects. The waveguides are simpler to fabricate than Ti-diffused guides, since they require only one evaporation and no diffusion. The resulting designs are of great simplicity, versatile, and have a relatively larger numeral aperture for better coupling to aperture fibers than the prior art. By using a three-electrode design, an improvement in sensitivity of 4 to 1 or greater over the prior art is obtained.

While the invention has been described in its preferred embodiments, it is to be understood that the words which have been used are words of description rather than of limitations and that changes within the purview of the appended claims may be made without departing from the true scope and spirit of the invention in its broader aspects.

What is claimed is:

1. Optical waveguide apparatus comprising:
   an optically transparent crystal substrate having an effective index of refraction responsive to voltage gradients and stress applied thereto, said substrate comprised of a substantially planar body,
   a plurality of coplanar rectilinear film stripes deposited only on one major surface of said substrate, said stripes being formed of a material having a predetermined inherent tensile stress when deposited and disposed so as to stress a region of said substrate underlying said stripes and patterned to provide at least one channel of increased relative index of refraction therebetween for propagating light waves incident thereon in the plane of said surface, and
   means for applying a bias potential between at least one adjacent pair of said film stripes, said stripes of said pair separated by a predetermined distance defining said at least one channel, the application of said bias potential causing a change in said stress induced refractive index so as to modulate said light wave energy in traversing said channel in accordance with the polarity and amplitude of said bias potential.

2. The optical waveguide apparatus as set forth in claim 1, wherein said substrate is $LiNbO_3$.

3. The optical waveguide apparatus as set forth in claim 1, wherein said substrate is $LiTaO_3$.

4. The optical waveguide apparatus as set forth in claim 1, wherein said film is selected from the group of metals consisting of chromium, aluminum, and gold.

5. The optical waveguide as set forth in claim 1, wherein: said at least one channel includes first and second channels for propagating said light wave energy,
   means for coupling light waves to said first channel,
   means for applying said bias potential such that light waves are selectively diverted between said first and second channels, and
   means for extracting said light waves from said first and second channels.

6. The optical waveguide as set forth in claim 5, wherein said film stripes comprise at least three substantially parallel coplanar metallic electrodes.

7. The optical waveguide as set forth in claim 6, further comprising means for independently applying said bias potential at a predetermined amplitude and polarity to ones of said electrodes.

8. The optical waveguide as set forth in claim 7, further comprising means for applying said bias potential in a first predetermined polarity to first and second adjoining ones of said electrodes, thereby defining a first channel, and applying said bias potential in a second predetermined polarity to said second one and a third one of said electrodes, thereby defining a second channel.

9. A method of fabricating an optical waveguide, comprising the steps of:
   providing a substantially planar substrate of optically transparent crystal material having an effective index of refraction responsive to photoelastic and electro-optic energization,
   depositing a metallic film on only one major surface of said substrate so that said substrate is subjected to a predetermined stress,
   patterning said metallic film to define a plurality of electrodes thereby defining regions of photo-elastically increased refractive index, said electrodes adapted to receive electro-optic bias to further alter said refractive index in said regions, and heating said film to a predetermined temperature for a predetermined time period, followed by cooling to ambient temperature.

10. The method of claim 9, in which said film is deposited by evaporation.

11. The method of claim 10, in which said film and said substrate have substantially different thermal coefficients of expansion, and said film is deposited and heated to an elevated predetermined temperature and then allowed to cool to ambient temperature.

12. The method of claim 10, in which said film is deposited at a rate of 3–4 A/sec.

13. The method of claim 9, in which said predetermined temperature is about 150° C.

14. The method of claim 9, in which said predetermined time period is at least one hour.

* * * * *